United States Patent
Ma et al.

(10) Patent No.: US 7,431,746 B2
(45) Date of Patent: Oct. 7, 2008

(54) HIGH PERFORMANCE INTERNAL REFORMING UNIT FOR HIGH TEMPERATURE FUEL CELLS

(75) Inventors: Zhiwen Ma, Sandy Hook, CT (US); Ramakrishnan Venkataraman, New Milford, CT (US); Lawrence J. Novacco, Brookfield, CT (US)

(73) Assignee: FuelCell Energy, Inc., Danbury, CT (US)

( * ) Notice: Subject to any disclaimer, the term of this patent is extended or adjusted under 35 U.S.C. 154(b) by 290 days.

(21) Appl. No.: 11/030,747

(22) Filed: Dec. 9, 2004

(65) Prior Publication Data

US 2006/0123705 A1    Jun. 15, 2006

(51) Int. Cl.
*B01J 8/00* (2006.01)
*B01J 7/00* (2006.01)
*H01M 8/06* (2006.01)
*C01B 3/36* (2006.01)
*C10J 3/46* (2006.01)
*C10J 3/54* (2006.01)

(52) U.S. Cl. .......................... 48/127.9; 48/61; 48/197 R
(58) Field of Classification Search ................ 48/127.9, 48/61
See application file for complete search history.

(56) References Cited

U.S. PATENT DOCUMENTS

| | | | |
|---|---|---|---|
| 3,899,420 A * | 8/1975 | Nozawa et al. ................ 48/109 |
| 4,182,795 A | 1/1980 | Baker et al. | |
| 4,365,007 A | 12/1982 | Maru et al. | |
| 4,567,117 A | 1/1986 | Patel et al. | |
| 4,778,110 A | 10/1988 | Sankey et al. | |
| 4,877,693 A | 10/1989 | Baker | |
| 5,175,062 A * | 12/1992 | Farooque et al. .............. 429/20 |
| 5,348,814 A | 9/1994 | Niikura et al. | |
| 5,660,941 A | 8/1997 | Farooque et al. | |
| 6,200,696 B1 | 3/2001 | Farooque et al. | |
| 6,274,101 B1 * | 8/2001 | Sechrist ...................... 422/198 |
| 7,338,643 B2 * | 3/2008 | Irons et al. ................... 422/187 |
| 2004/0071617 A1 | 4/2004 | Blanchet, et al. | |

OTHER PUBLICATIONS

Zhiwen Ma, et al., Mathematical modeling of internal-reforming, carbonate fuel cell stack, Second International Conference on Fuel Cell Science, Engineering and Technology (2004), pp. 1-8.

* cited by examiner

*Primary Examiner*—Alexa D. Neckel
*Assistant Examiner*—Matthew J Merkling
(74) *Attorney, Agent, or Firm*—Cowan, Liebowitz & Latman, P.C.

(57) ABSTRACT

A fuel reformer having an enclosure with first and second opposing surfaces, a sidewall connecting the first and second opposing surfaces and an inlet port and an outlet port in the sidewall. A plate assembly supporting a catalyst and baffles are also disposed in the enclosure. A main baffle extends into the enclosure from a point of the sidewall between the inlet and outlet ports. The main baffle cooperates with the enclosure and the plate assembly to establish a path for the flow of fuel gas through the reformer from the inlet port to the outlet port. At least a first directing baffle extends in the enclosure from one of the sidewall and the main baffle and cooperates with the plate assembly and the enclosure to alter the gas flow path. Desired graded catalyst loading pattern has been defined for optimized thermal management for the internal reforming high temperature fuel cells so as to achieve high cell performance.

15 Claims, 9 Drawing Sheets

FIG. 7B
*(PRIOR ART)*

HIGH PERFORMANCE INTERNAL REFORMING UNIT FOR HIGH TEMPERATURE FUEL CELLS

STATEMENT AS TO RIGHTS TO INVENTIONS MADE UNDER FEDERALLY SPONSORED RESEARCH AND DEVELOPMENT

This invention was made with Government support under contract DE-FC21-95MC31184 awarded by the Department of Energy. The Government has certain rights in the invention.

BACKGROUND OF THE INVENTION

This invention relates to fuel cells and, in particular, to a fuel reforming unit for use with such fuel cells.

A fuel cell is a device, which directly converts chemical energy stored in hydrocarbon fuel into electrical energy by means of an electrochemical reaction. Generally, a fuel cell comprises an anode and a cathode separated by an electrolyte, which serves to conduct electrically charged ions. Fuel cells operate by passing a reactant fuel gas through the anode, while passing oxidizing gas through the cathode. In order to produce a useful power level, a number of individual fuel cells are stacked in series with an electrically conductive separator plate between each cell.

Before undergoing the electrochemical reaction in the fuel cell, hydrocarbon fuels such as methane, coal gas, etc. are typically reformed to produce hydrogen for use in the anode of the fuel cell. In internally reforming fuel cells, a steam reforming catalyst is placed within the fuel cell stack to allow direct use of hydrocarbon fuels without the need for expensive and complex reforming equipment. In addition, the endothermic reforming reaction can be used advantageously to help cool the fuel cell stack.

Internally reforming fuel cells employing direct internal reforming and indirect internal reforming have been developed. Direct internal reforming is accomplished by placing the reforming catalyst within the active anode compartment. The major disadvantage of direct internal reforming is the exposure of the catalyst to the electrolyte of the fuel cell, which can significantly degrade the fuel cell's performance. Improvements to the direct internal reforming technique intended to avoid electrolyte contamination have suffered from other disadvantages such as the high cost due to the complexity of fuel cell design, special materials requirements and reduction in the effectiveness of the reforming catalyst.

The second reforming technique, indirect internal reforming, is accomplished by placing the reforming catalyst in an isolated chamber within the fuel cell stack and routing the reformed gas from this chamber into the anode compartment of the fuel cell. The disadvantages of indirect internal reforming, however, include the requirement of separate ducting systems, the high cost of the fuel cell stack and the susceptibility to fuel leaks.

The present state of the art utilizes a hybrid assembly of a fuel cell with both direct and indirect internal reforming. U.S. Pat. No. 6,200,696 describes such a hybrid assembly, in which the indirect internal reformer is designed with a substantially U-shaped flow geometry, which allows the inlet fuel feed tubes to also be contained within the fuel-turn manifold thereby mitigating the risk of system fuel leaks. This configuration, however, results in large temperature gradients near the edge of the fuel cell plate due to a non-optimized flow field and catalyst distribution. In another assembly, U.S. patent application Ser. No. 10/269,481, assigned to the same assignee hereof, an improved reformer is provided which has a substantially U-shaped flow geometry and includes a plate assembly for supporting a reforming catalyst and a compliant baffle cooperating with the plate assembly to provide an improved flow field. The baffle and plate assembly of the '481 application segment the enclosure into several sections, including an inlet section, a turn section, a return section and an outlet section. The compliant baffle of the '481 application allows for improved sealing to prevent the escape of gases from the reformer and is arranged to direct the flow of gas to predetermined areas of the plate. Additionally, the reforming catalyst in the reformer of the '481 application is disposed in a pattern such that the reformer is devoid of catalyst in the inlet section to a point in the turn section and includes catalyst from that point in the turn section through the return section, varying in amount in a predetermined manner.

The aforesaid assembly of the '481 patent application provides an improved flow field and catalyst distribution. As a result, non-uniformity in reforming and temperature gradients in the assembly are reduced by counteracting a natural temperature distribution within the assembly and by providing more cooling to the hottest areas of the plate. However, because electrochemical heating and reforming cooling are very complex interactions, the hottest areas of the plate are not always the areas which require the most cooling as provided in the reformer of the '481 application. For example, the location of the fuel cell's maximum temperature as well as its current density, need to be considered in providing increased fuel flow and cooling to predetermined areas of the plate. Moreover, temperature distribution in the assembly at different times during the operating life also should be taken into account when regulating temperature distribution within the assembly.

It is therefore an object of the present invention to provide further improvements in the fuel flow field and catalyst distribution in the reformer assembly.

It is a further object of the present invention to provide a reformer assembly, which has enhanced performance and endurance.

SUMMARY OF THE INVENTION

In accordance with the principles of the present invention, the above and other objectives are realized in a fuel reformer having an enclosure with first and second opposing surfaces, a sidewall connecting the first and second opposing surfaces and an inlet port and an outlet port in the sidewall. A plate assembly, which supports a catalyst, and baffles are also disposed in the enclosure. These baffles include a main baffle and at least a first directing baffle. The main baffle extends into the enclosure from a point in the sidewall between the inlet and outlet ports and cooperates with the enclosure and with the plate assembly to establish a flow path for the flow of fuel gas through the reformer from the inlet port to the outlet port. The first directing baffle, in turn, also extends into the enclosure from one of the sidewall and the main baffle and cooperates with the enclosure and the plate assembly to alter the flow path.

In the embodiment of the invention to be disclosed hereinafter, the first directing baffle extends from the sidewall and the reformer includes a second directing baffle which also extends into the enclosure from the main baffle and cooperates with the enclosure and the plate assembly to likewise alter the flow path. In this embodiment, the enclosure, the plate assembly and the main baffle define an inlet section communicating with the inlet port, an outlet section communicating with the outlet port and a turn section connecting the inlet and outlet sections. The first and second directing baffles are positioned in the return section adjacent and spaced from the outlet port, respectively, and the end of the main baffle is configured so as to promote movement of said gas flow path toward the central region of the return section. Additionally, in the disclosed embodiment, catalyst is loaded in the plate assembly in a predetermined manner to provide desired cooling in such central region of the return section.

It is also within the contemplation of the invention to provide a fuel reformer comprising: an enclosure having: first and second opposing surfaces; a sidewall connecting said first and second opposing surfaces; and an inlet port and an outlet port in said sidewall; a plate assembly for supporting catalyst disposed within said enclosure; and a baffle assembly disposed within said enclosure and cooperating with said enclosure and said plate assembly to establish a flow path for the flow of fuel gas through said reformer from said inlet port to said outlet port; and wherein the baffle assembly and the catalyst supported in the plate assembly are such that when the reformer is utilized in a fuel cell stack the reformer causes cooling of the fuel cell stack so as to promote less cooling in the portion of the fuel cell stack adjacent the fuel exhaust of the fuel cell stack, greatest cooling through the middle of the stack and increased cooling at the fuel inlet of the stack. It also provides the appropriate amount of unreformed gas to provide the direct reforming catalyst with endothermic potential.

BRIEF DESCRIPTION OF THE DRAWINGS

The above and other features and aspects of the present invention will become more apparent upon reading the following detailed description in conjunction with the accompanying drawings in which.

DETAILED DESCRIPTION

Figure 1:
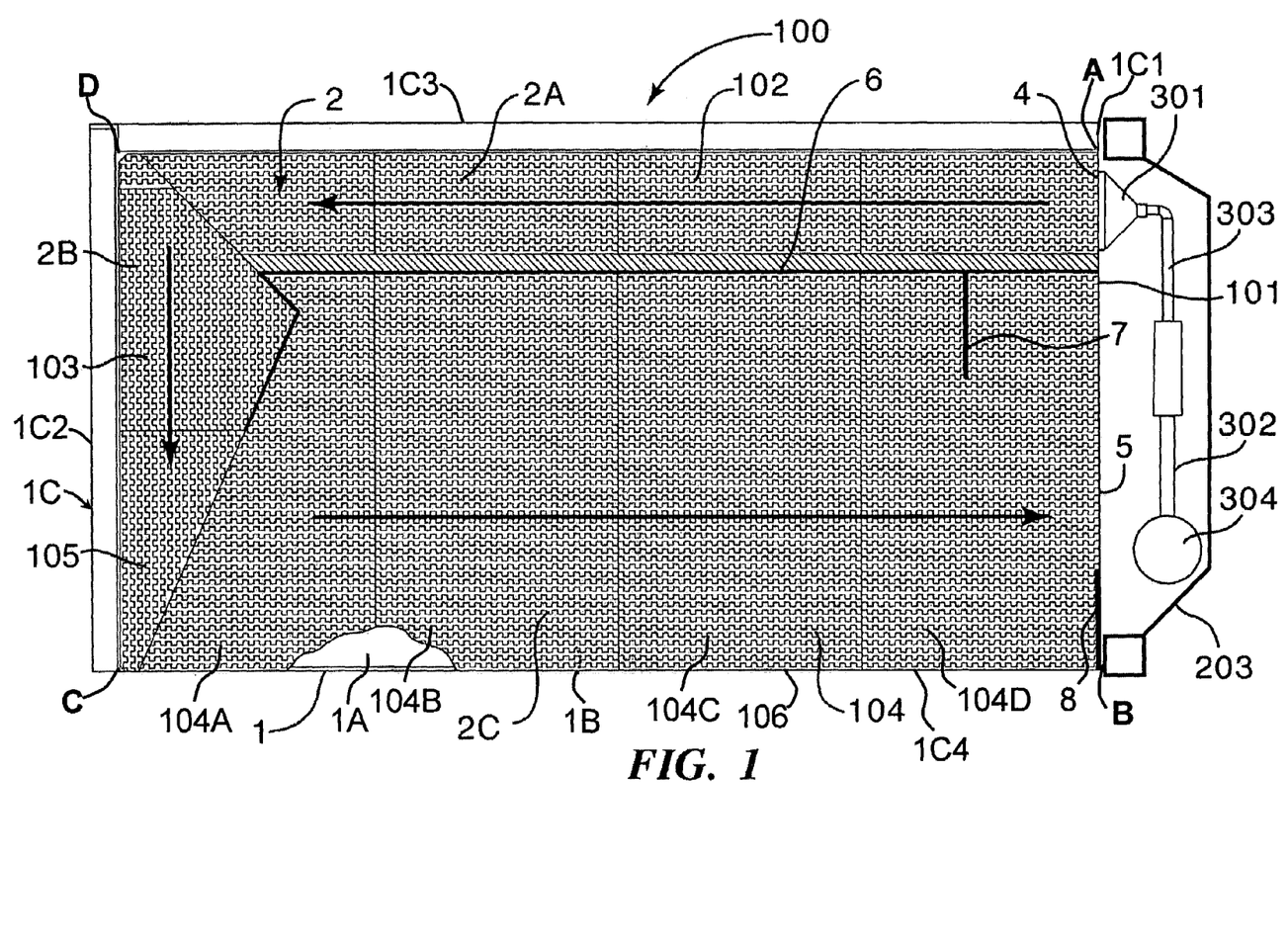
FIG. 1 shows a plan view of a reformer in accordance with the principles of the present invention.

FIG. 1 shows a plan view of a reforming unit or a reformer 100 in accordance with the principles of the present invention. The reforming unit 100 comprises an outer housing or foil 1 having first and second opposing surfaces 1A and 1B whose peripheries are connected by a sidewall 1C which extends between the surfaces to connect them and form an enclosed housing. The sidewall 1C includes first and second opposing sidewall sections 1C1 and 1C2 and third and fourth opposing sidewall sections 1C3 and 1C4. In the case shown, the sidewall section 1C1 extends between a first set of opposing ends of the sidewall sections 1C3 and 1C4 and the sidewall section 1C2 extends between a second set of opposing ends of the sidewall sections 1C3 and 1C4.

The housing 1 houses or envelops a plate assembly 2 comprising plates of corrugated sheet metal 2A-2C. Inlet and outlet ports 4 and 5 of the reformer 100 are located on the same face 101 of the reformer 100 formed by the sidewall section 1C1 of the housing 1. These ports are adjacent to and isolated from one another.

Figure 2:
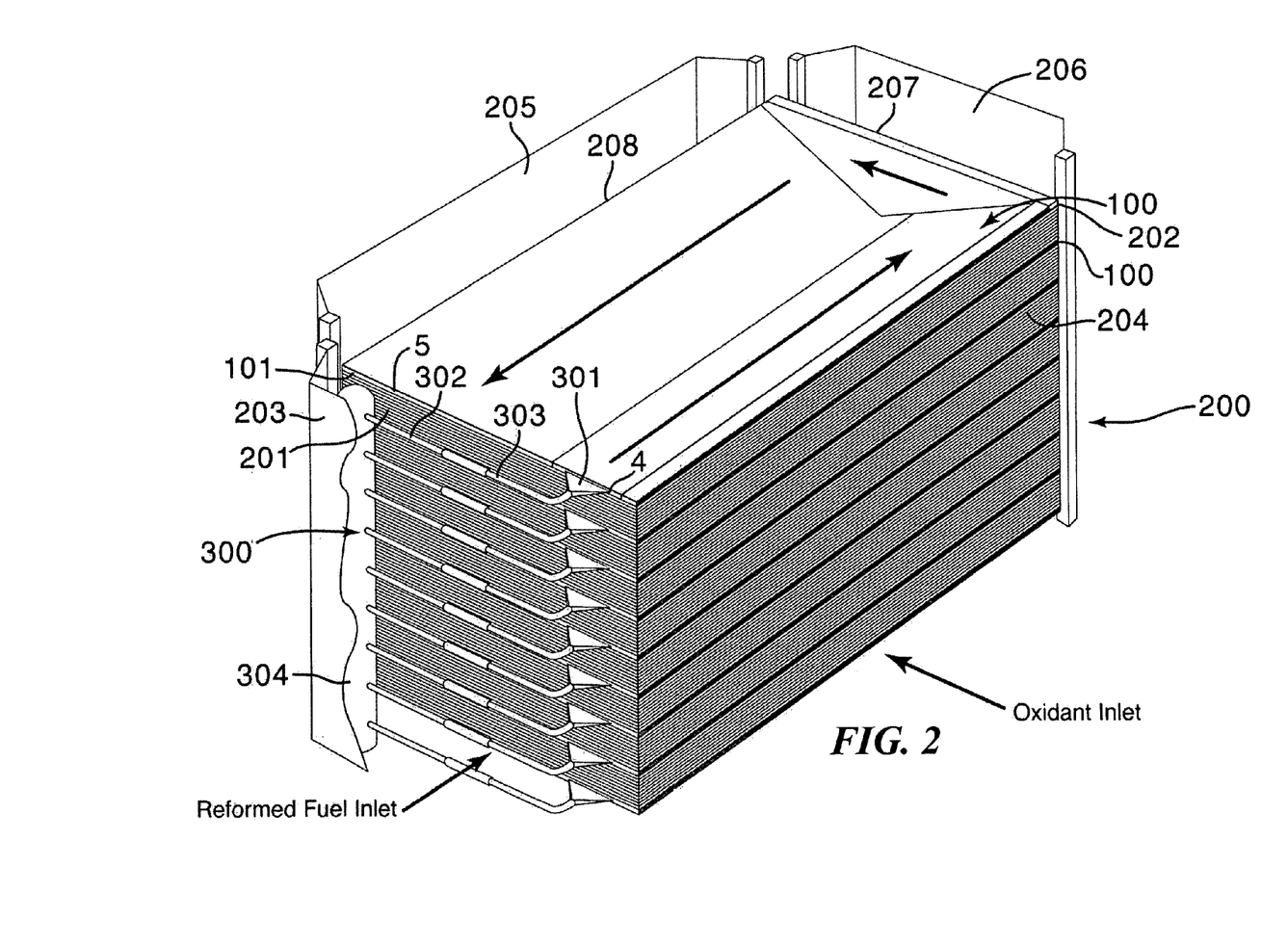
FIG. 2 shows an illustrative cross-flow fuel cell stack employing the reformer of FIG. 1.

When used in a fuel cell stack, a plurality of reformers 100 shown in FIG. 1 are arranged in interleaved fashion with groups of fuel cells 202 of the stack. Such an arrangement is shown in FIG. 2, and as can be seen, the face 101 of each reformer 100 forms part of the face 201 of the fuel cell stack 200. Anode chamber inlets of the fuel cells 202 are also located on the face 201 of the stack 200.

Referring to FIG. 2, fuel gas is supplied to the reformers 100 via a reformer fuel delivery system 300 which comprises a plurality of plenums 301, each plenum 301 attached to the inlet port of the respective reformer 100, and feed tube sections 302 and 303 connected to each plenum 301. Fuel gas is supplied from a common fuel inlet header pipe 304 to the feed tube sections 302 and 303 of each reformer 100 and from the feed tube sections to the associated plenum 301. Fuel gas is then delivered from each plenum 301 through the inlet to the respective reformer.

As shown in FIG. 2, the fuel gas and the oxidant gas pass through the fuel cells 202 of the stack 200 in cross-flow to each other. The face 201 of the fuel cell stack 200, via which fuel gas is delivered to the reformers 100 and the fuel cells 202, is covered by a fuel-turn manifold 203. The fuel-turn manifold 203 encapsulates the reformer fuel delivery system 300 and the inlet 4 and outlet 5 ports of the reformers 100, and thereby acts to prevent loss of fuel due to small leaks in the fuel delivery system 300. As also shown, the fuel cell stack 200 includes manifolds 205 and 206 for receiving exhausted oxidant and fuel gases, respectively, leaving the stack 200.

The fuel cell stack assembly shown in FIG. 2 comprises a hybrid internal reforming assembly, where in addition to the indirect internal reformers 100, reforming catalyst is provided in the anode chambers of the fuel cells 202 for direct internal reforming. Accordingly, any unreformed fuel leaving the reformers 100 of FIG. 1 is then reformed in the anode chamber of the fuel cell 202.

Referring now to FIG. 1, the reformer 100 illustrated here is rectangular in shape and, as can be appreciated, the dimensions of the reformer 100 correspond to the dimensions of the fuel cell stack cross-section. The corners of the reformer 100 are labeled A through D and correspond to the respective corners of the fuel cell stack 200. Corner A of the reformer 100 is adjacent the fuel gas inlet of the reformer 100 and corresponds to the corner of the fuel cell stack that is adjacent the fuel gas inlet and the oxidant inlet faces. Corner B of the reformer 100 is adjacent the reformed gas outlet of the reformer 100 and corresponds to the corner of the fuel cell stack which is adjacent the fuel gas inlet face and the oxidant gas outlet face of the stack. Corner C of the reformer 100 corresponds to the stack corner which is adjacent the fuel gas outlet and oxidant gas outlet faces of the stack, while corner D of the reformer 100 corresponds to the fuel cell stack corner adjacent the oxidant gas inlet face and fuel gas outlet face.

As shown in FIG. 1, the corrugated sheet metal plates 2A-2C of the reformer 100 are arranged in such a way as to cooperate with the housing 1 to provide a generally U-shaped flow path for the fuel gas. The plate 2B is triangular in shape, while the plates 2A and 2C are substantially rectangular in shape, with the plate 2A being narrower in width than the plate 2C. The far end of the plate 2A is angled to abut and follow a first inclined surface of the plate 2B at the interface of the plates 2A and 2B. The far end of the plate 2C is also similarly angled to abut and follow the remaining portion of this inclined first surface of the plate 2B at the interface of the plates 2B and 2C. The far end of the plate 2C is then further angled to abut and follow a second inclined surface of the plate 2B, this second inclined surface being situated adjacent the first inclined surface.

With this configuration, the flow channels formed by the corrugated sheet metal plates 2A-2C allow the gas to flow from the inlet port 4 along the length of the plate 2A (the "inlet section" 102 of the reformer 100). The gas then turns 90 degrees at the interface between the plates 2A and 2B, thereafter flowing along the length of the plate 2B (the "turn section" 103 of the reformer 100, which due to the narrower width of the plate 2A is of larger width than the inlet section 102). The gas at the interface of the plates 2B and 2C again turns 90 degrees and flows along the length of the plate 2C (the "return section" 104 of the reformer 100) in a direction counter to the inlet section. The return section 104 of the reformer 100 is divided into four sub-sections 104A-104D such that the first subsection 104A of the return section 104 and is adjacent the turn section 103, and the fourth subsection 104D is adjacent the outlet 5 of the reformer 100.

To isolate the inlet section 102 of the reformer 100 from the return section 104 and to provide further direction to the gas in the turn section 103, the reformer 100 is provided with a main baffle 6 which further cooperates with the plate assembly 2 and housing 1 to establish the gas flow path. As shown, the baffle 6 extends between the opposing surfaces 1A and 1B of the housing 1 and is directed along substantially the entire interface of the plates 2A and 2C and along a part of the interface of the plates 2B and 2C, i.e., along the interface part containing the first inclined surface of the plate 2B and a segment of the second inclined surface extending from the first inclined surface. The baffle 6 thus helps to prevent the fuel gas from flowing from the inlet section 102 directly into the return section 104 of the reformer, and instead directs the flow of gas through the turn section 103. In the illustrative embodiment shown in FIG. 1, the segment of the baffle 6 which extends along the interface part containing the segment of the second inclined surface of plate 2B, is made shorter than the same segment of the baffle shown in FIG. 1 of the '481 patent application. In the case shown, this segment is made as short as the segment of the baffle 6 which extends along the first inclined surface of the plate 2B. In this way, a greater flow of gas from the turn section 103 is directed to the center of the return section 104 of the plate.

With this configuration of the reformer 100, fuel gas enters the inlet port 4 through the plenum 301 and flows along the inlet section 102 without leaking into the return section 104. The flow of the fuel gas is then directed by the baffle 6 and the plates 2A and 2B to turn 90 degrees to flow along the turn section 103 in the direction of the corner C of the reformer. The fuel gas then again turns 90 degrees and flows along the return section 104, exiting the reformer 100 through the outlet port 5.

As the fuel gas flows through the reformer 100 in the U-shaped path, it undergoes an endothermic reforming reaction, thereby creating a cooling effect in the surrounding areas of the fuel cell stack. As can be appreciated, the rate of the endothermic reforming reaction in any particular area of the reformer 100 will determine the amount of cooling provided to the corresponding area of the fuel cell stack. Among the factors controlling the reforming rate in a particular area of the reformer is the amount of fuel gas reaching that area of the reformer, which can be controlled through fuel flow regulation.

In order to improve flow field regulation of the fuel gas flowing through the reformer 100, the reformer is provided with a first directing exit baffle 7 and a second directing exit baffle 8 disposed in the return section of the reformer 100. These baffles cooperate with the housing 1 and the plate assembly 2 to alter the U-shaped flow path in a desired manner, as will be discussed in more detail herein below.

As shown, the first exit baffle 7 extends between the surfaces 1A and 1B of the housing 1 and from the baffle 6 into the return section 104 of the reformer and is substantially perpendicular to the baffle 6. In the illustrated example shown in FIG. 1, the first exit baffle 7 is located in the fourth subsection 104D of the return section 104 and in spaced relation to the outlet port 5 of the reformer 100. The second exit baffle 8 also extends between the surfaces 1A and 1B of the housing 1 into the return section 104 from the sidewall section 1C of the housing. As illustrated in FIG. 1, the second exit baffle 8 is adjacent to the outlet port 5 of the reformer 100. However, it is understood that the location of the exit baffles 7 and 8 may be varied along the flow path of the fuel gas in the return section 104 so as to provide desired fuel flow in the return path of the plate 2C.

As discussed in more detail herein below, exit baffles 7 and 8 act to guide the fuel flow through the center of the return path 104 to provide focused cooling to predetermined areas of the stack. Particularly, the first exit baffle 7 creates a barrier in the flow path of the fuel gas flowing in the return path 104 near or adjacent to the baffle 6 and tends to push this fuel gas in a direction opposite to the flow of gas in the return path 104. As a result, a flow field is created which directs the fuel gas path along the baffle 6 in the return path 104 laterally in the direction of the sidewall section 1C4 and toward the center portion of the return path 104.

The second exit baffle 8 creates a similar barrier in the flow path of the fuel gas flowing near or adjacent to the sidewall section 1C1 of the housing 1 of the reformer 100. This baffle 8 also creates a flow field which tends to push the fuel gas flow path toward the barrier 6 and also toward the center of the return path 104. In this way, exit baffles 7 and 8 enhance the mixing of the fuel gas exiting the reformer 100 to provide a uniform gas concentration. The first exit baffle 7 also prevents reformed fuel gas flowing through the return path 104 from slipping through the separator edge of the baffle 6, while the second exit baffle 8 tends to prevent the flow of the fuel gas to a lower temperature region near a corner B of the reformer 100.

Because the reforming reaction is catalyst driven, another factor controlling the reforming reaction rate in a particular area of the reformer 100 is the amount of reforming catalyst. Accordingly, to facilitate the reforming reaction, and thus the cooling effect, catalyst is strategically distributed within the reformer. The distributed reforming catalyst may be in the form of catalyst pellets, tablets and any other form.

Figure 3:
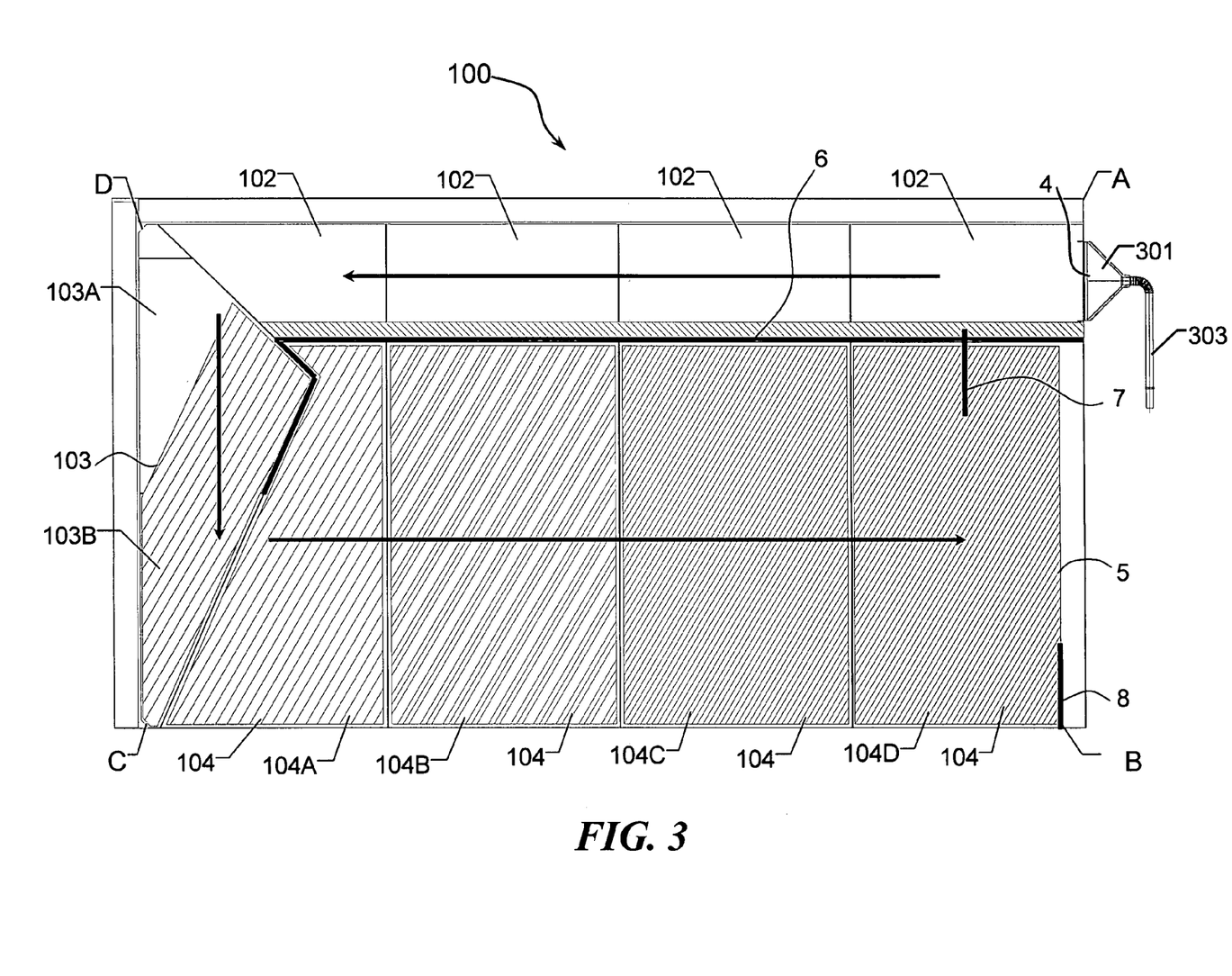
FIG. 3 shows an illustrative pattern for loading the reforming catalyst into the reformer of FIG. 1.

FIG. 3 shows an illustrative pattern for loading the reforming catalyst into the reformer 100 used in a fuel cell stack 200 having a cross-flow gas arrangement described above. In accordance with the invention, the distribution of the reforming catalyst in the reformer 100 is such as to provide a distribution of fuel gas reforming to cool selected areas of the fuel cell stack and improve temperature distribution when the reformer is used in the fuel cell stack. More particularly, the improved temperature distribution results in cooling being provided so as to prevent the hottest areas of the stack from overlapping with the areas of the stack having the highest current density. The loading pattern of the reforming catalyst together with the baffle 6 and the exit baffles 7 and 8 accomplish such improved temperature distribution and cooling of predetermined areas over the life of the fuel cell stack.

As shown in FIG. 3, the reformer has no catalyst in the inlet section 102 which extends along the oxidant inlet face 204 of the stack 200. This arrangement avoids excessive cooling of the stack 200 along the oxidant inlet face 204 and also allows the reformer to act as a heat exchanger to warm the incoming fuel gas with heat from the oxidant inlet gas. Moreover, there is no catalyst in the corner subsection 103A of the turn section 103 adjacent to the inlet section 102 of the reformer.

As also shown in FIG. 3, catalyst loading begins in a part of the turn section 103 and along the entire return section 104 of the reformer. These areas of the reformer are located in the areas of the stack where the temperature and the current density of the stack are higher. Gradual increase in loading along the flow path of the fuel is desired in these areas of the reformer since the reforming catalyst is very active.

Particularly, catalyst loading begins in the subsection 103B of the turn section with a very low loading density and continues into a first subsection 104A of the return section 104, where slightly higher, but still fairly low, catalyst loading density is used. Low catalyst loading density in subsections 103B and 104A prevents overcooling of the reformer in the fuel exhaust area of the stack and attracts higher temperatures to these sections. Moreover, subsections 103B and 104A of the reformer correspond to low current density areas of the stack. By attracting high temperatures to subsections 103B and 104A, the maximum temperature of the fuel cell stack is controlled by distributing the high temperature areas to multiple low current density sections of the stack. Also, high temperature in subsections 103B and 104A of the reformer 100 results in a higher methane reforming rate. As a result, more cooling is provided in the succeeding sections of the return section 104, thereby reducing the maximum temperature of the stack 200. The distance between corner A of the reformer, which corresponds to a low temperature area of the stack 200, and the high temperature subsections 103B and 104A also aids in reducing the temperature gradient in the fuel cell stack.

As can be seen in FIG. 3, the catalyst loading density further increases in a second subsection 104B of the return section. In order to maintain a uniform temperature in the corresponding areas of the fuel cell stack, it is desirable to use split loading of the catalyst in the second subsection 104B, such that the catalyst density gradually increases in the direction of the fuel flow. The gradual increase in the catalyst loading density of subsection 104B coordinates the cooling in the stack with the fuel cell heat generation.

The remaining subsections 104C and 104D of the reformer have high catalyst loading densities, which are higher than the catalyst density in the second section 104B. High catalyst density in section 104C, and thus greater cooling in the corresponding area of the stack, aids in separating the high current density area of the stack from the high temperature areas and to reduce the maximum temperature of the stack. At the same time, high catalyst density in section 104D provides additional anode inlet side cooling, particularly after deterioration of the direct reforming catalyst in the anode chambers.

In the illustrative example of the loading pattern here, $1/12$ catalyst loading density is used in section 103B of the reformer, where $1/12$ of the loading area of the section 103B contains the reforming catalyst, and section 104A has a $1/5$ catalyst loading density. As also illustrated here, split loading of the catalyst in section 104B is accomplished by providing $1/4$ loading density in a portion of the section 104B adjacent to the first section 104A and gradually increasing the density to $1/3$ in the direction of the fuel flow along section 104B. The catalyst density is further increased to $2/3$ in sections 104C and 104D.

Figure 4A:
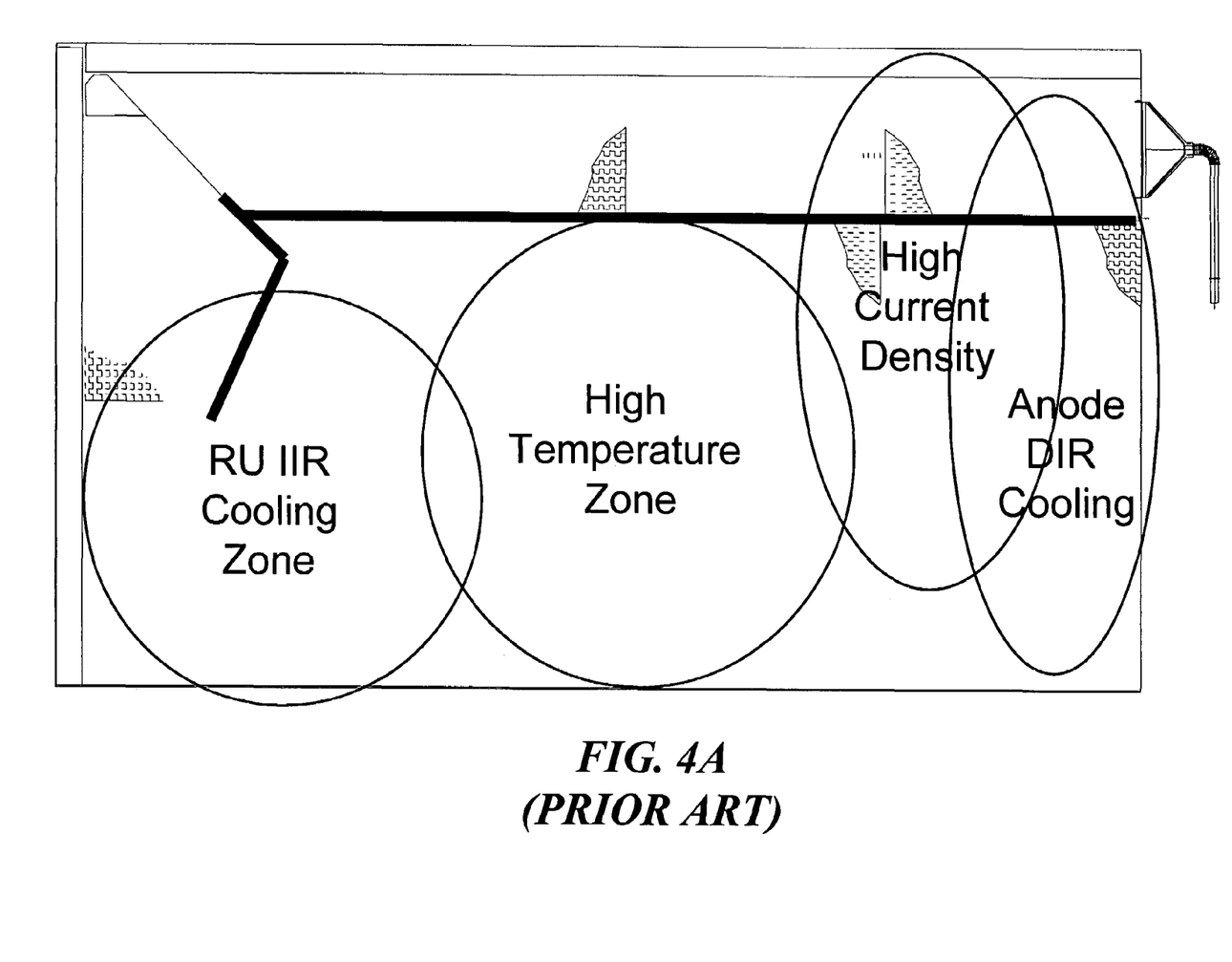
FIG. 4A shows a schematic view of a thermal management design of a prior art reformer.

The above-described arrangement of the reformer 100 improves the fuel flow within the reformer 100 and the temperature distribution within the fuel cell stack 200. Particularly, the natural temperature distribution within a fuel cell stack is usually coldest in the region near corner A of the reformer 100 and hottest in the region near corner C. The reformer arrangement described in the above-mentioned '481 application counteracts this natural temperature distribution to provide more cooling near corner C, thus reducing the maximum temperature naturally experienced by the stack near this corner. FIG. 4A shows a schematic view of a thermal management design of the reformer in the '481 application. As can be seen in FIG. 4A, enhanced cooling of the stack in the region near the fuel gas and oxidant gas outlets is accomplished by using the baffle 6 in the reformer 100 to direct the fuel gas flow toward the corner C of the reformer 100 and by strategical placing of the catalyst as described in the '481 application. Additionally, cooling along the fuel gas inlet region of the stack is accomplished by the direct reforming catalyst disposed within the anode chamber. As also shown in FIG. 4A, the arrangement in the '481 application results in the fuel cell stack's high temperature zone being located in the central region of the stack, which is near, and partially overlapping with, the high current density zone of the stack. The overlap between the high temperature zone and the high current density zone aggravates the local heating in the cell and induces extremely high temperature locally in the stack, that limits the maximum current density and restricts the power output of the stack. Moreover, fuel utilization by the fuel cells in the stack is limited by such overlap, thus reducing the overall efficiency of the stack 200.

Figure 4B:
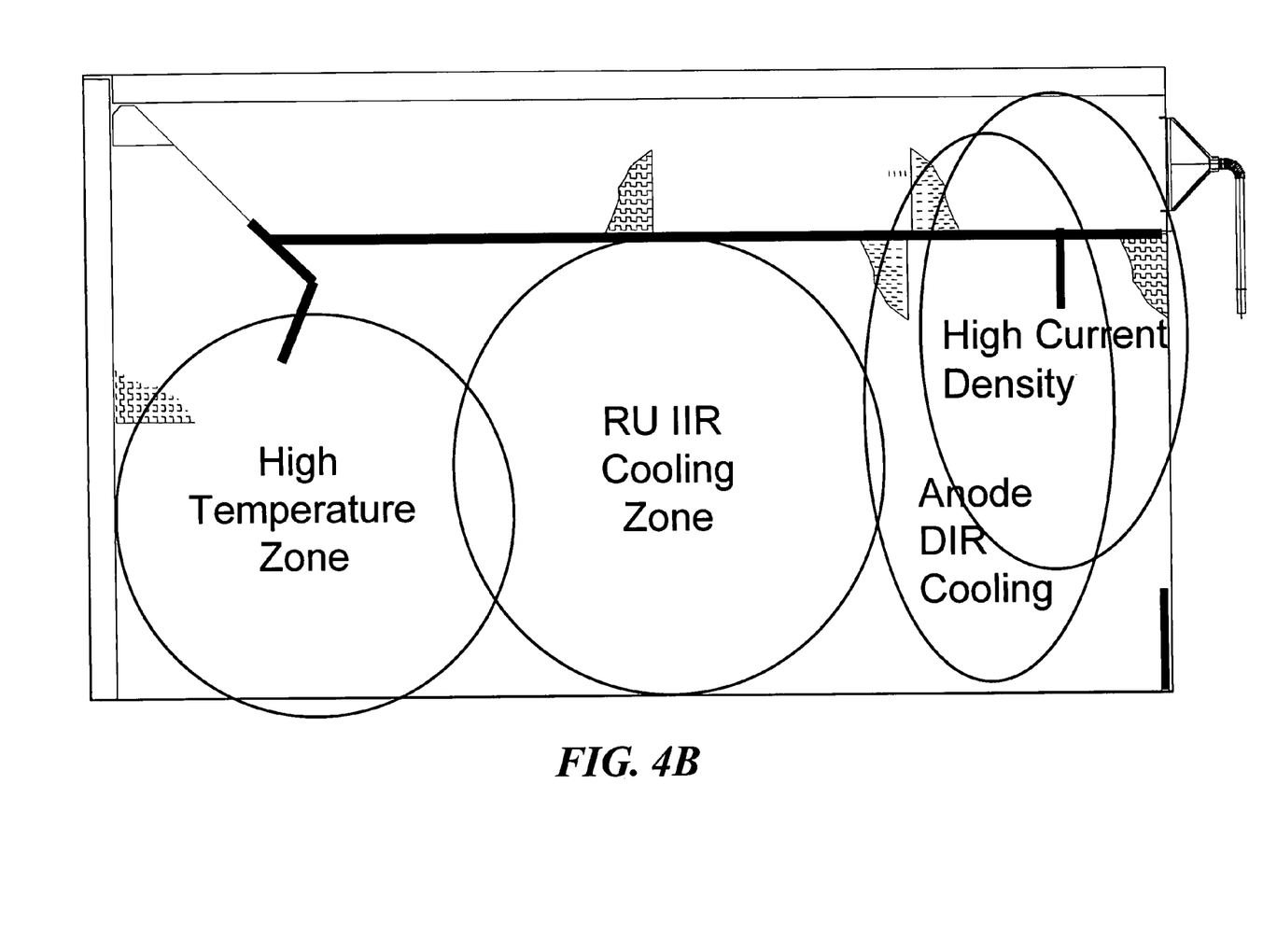
FIG. 4B shows a schematic view of a thermal management design of the reformer of FIGS. 1 and 3.

As described above, the baffle arrangement and catalyst distribution of the reformer 100 shown in FIGS. 1 and 3, pushes the high temperature zone in the fuel cell stack toward the fuel gas and oxidant gas outlet region of the stack. FIG. 4B shows a schematic view of a thermal management design of the reformer of FIGS. 1 and 3 in accordance with the present invention.

As shown in FIG. 4B, the high temperature zone in the stack is shifted in the direction of the fuel gas outlet side of the stack, or corner C of the reformer, while the indirect internal reforming cooling zone is now located in the central region of the stack. Moreover, the high current density zone in the stack shifts closer to the fuel gas inlet, while the direct internal reforming cooling zone moves away from the fuel gas inlet area of the stack, thus resulting in a greater overlap between the cooling and the high current density zones within the stack. As discussed above, the light loading density of the reforming catalyst in the turn section 103B and the first section 104A of the return section of the reformer 100 results in lower reforming reaction rates in these sections, and thus a higher temperature zone. Also, a shorter baffle 6 portion in the area of the turn section 103 of the reformer, as well as the barriers created by the exit baffles 7 and 8, provide more fuel gas to the center of the return section which, together with higher catalyst density in sections 104B and 104C of the reformer, increases the rate of the reforming reaction in this region. Accordingly, greater cooling is provided in the center region of the return section 104 of the reformer and thus a cooling zone is created as shown in FIG. 4B.

As discussed further below, the reformer arrangement shown in FIGS. 1 and 3, when used in a fuel cell stack, results in reduced maximum temperature in the fuel cell stack as well as lower temperature gradients. More particularly, the maximum temperature of the stack is reduced by approximately 20° C., i.e. from a maximum temperature of 695° C. in the stack employing the reformer of the '481 application to approximately 677° C. In addition, the temperature gradient in the stack employing the reformers in accord with the invention is about 100° C., while the temperature gradient in the stack of the '481 patent application is 125° C. Moreover, the stack current density is increased when using the reformers in accord with the present invention by 25%, thus increasing the power output in a fuel cell power plant utilizing such stacks, and the fuel utilization is improved by about 4%. In addition, fuel utilization rates in the stacks employing the reformers 100 increased by 5% compared to the '481 application design.

Figure 5A:
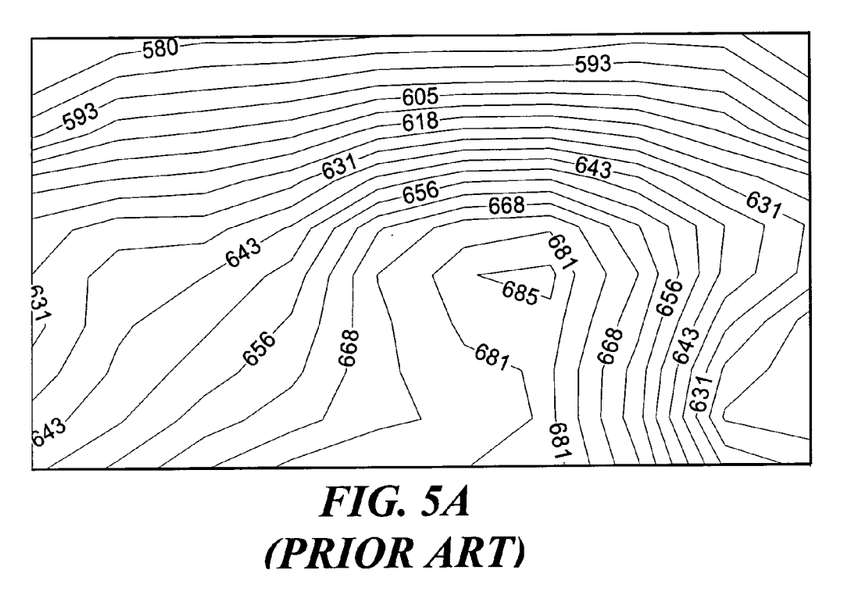
FIG. 5A shows a line contour diagram of a temperature distribution in a fuel cell stack employing a prior art reformer.

Improved temperature distribution in the fuel cell stacks employing the reformers in accord with the present invention, as compared to the reformer arrangement of the '481 patent application, is shown in FIGS. 5A-5D. Particularly, FIG. 5A shows a line contour diagram of a temperature distribution in a fuel cell stack employing the reformer design of the '481 application. The temperature distribution shown in FIG. 5A corresponds to the thermal management approach of FIG. 4A. As shown in FIG. 5A, the high temperature zone in the stack is located approximately in the central portion of the fuel cell stack. The maximum temperature of the stack is approximately 685° C. As also shown, the temperature of the stack is lower near the stack corner adjacent the anode and cathode outlets, corresponding to the corner C of the reformer, and corresponds to the indirect internal reforming cooling zone shown in FIG. 4A. Moreover, lower temperatures along the fuel inlet side of the stack correspond to direct internal reforming within the anode, and to the anode direct internal reforming cooling zone of FIG. 4A.

Figure 5B:
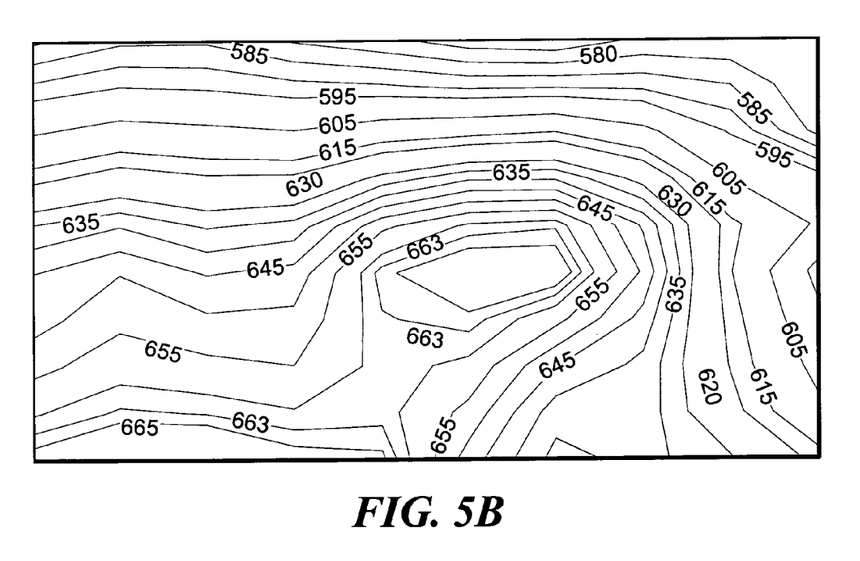
FIG. 5B shows a line contour diagram of a temperature distribution of a fuel cell stack employing a reformer of FIG. 1 at the beginning of stack operating life.
Figure 5C:
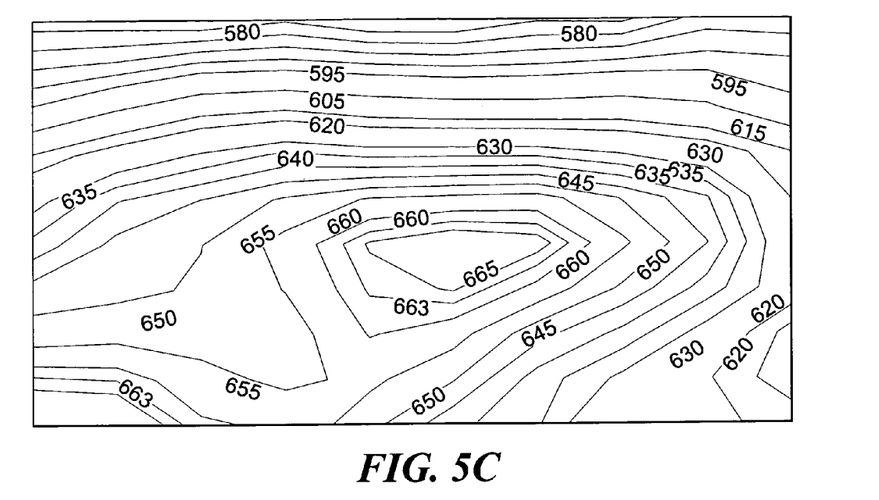
FIG. 5C shows a line contour diagram of a temperature distribution of a fuel cell stack employing a reformer of FIG. 1 at the middle of stack operating life.
Figure 5D:
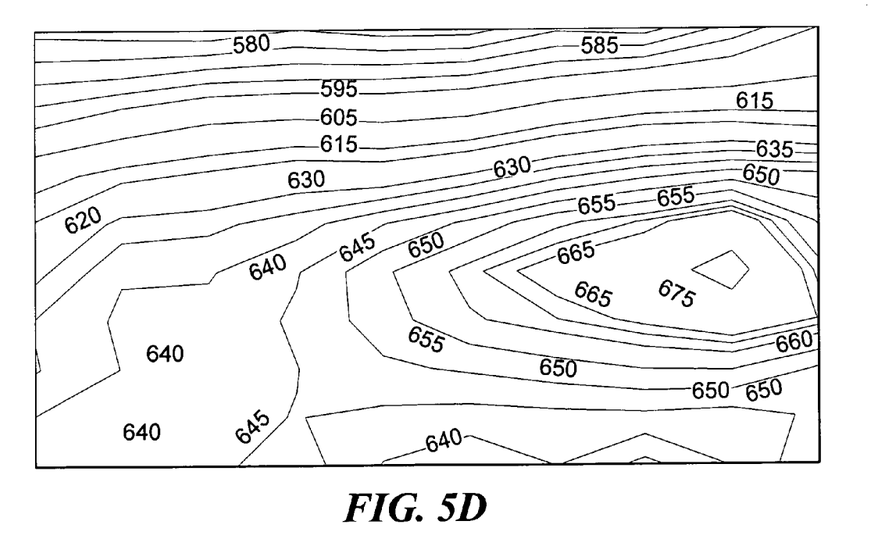
FIG. 5D shows a line contour diagram of a temperature distribution of a fuel cell stack employing a reformer of FIG. 1 at the end of stack operating life.

FIGS. 5B-5D show line contour diagrams of temperature distributions in a fuel cell stack employing the reformer of FIG. 1 in accord with the present invention at different times during the stack operating life. More particularly, FIG. 5B shows a temperature distribution in the stack at the beginning of the stack operating life ("beginning-of-life"), FIG. 5C shows a temperature distribution in the same stack at the middle of the stack operating life ("mid-life"), and FIG. 5D shows a temperature distribution in the stack at the end of the stack operating life ("end-of-life").

As shown in FIG. 5B, at the beginning-of-life of the stack, the temperature in the region near the corner of the stack adjacent to the fuel and oxidant outlets is the highest. This region of the stack corresponds to the high temperature zone shown in FIG. 4B. As also shown, the central region of the stack is provided with additional cooling such that the temperature in this region is reduced by at least 20° C. as compared to the temperature in the same region of the stack in FIG. 5A. As can be seen in FIG. 5B, the temperature distribution in the stack is more uniform, and the temperature gradient is reduced, particularly in the central region of the stack and along the fuel inlet face of the stack. As can also be seen, the maximum temperature in the stack is decreased from 685° C., shown in FIG. 5A, to approximately 665° C., thus also reducing temperature deviations between different regions of the stack.

The temperature distribution shown in FIG. 5B changes with the operating time of the fuel cell stack. Referring now to FIG. 5C, the temperature distribution at the mid-life of the stack after approximately 20,000 hours of operation was tested. As shown, the temperature of the central region of the stack slightly increased to about 665° C. At the same time, it can be seen that the high temperature zone was still present in the region near the corner of the stack adjacent the fuel and oxidant outlets, although it encompassed a smaller area of the stack. Thus it can be seen that at the mid-life point of operation of the stack, the high temperature zone in the stack began to shift in the direction of the fuel inlet side of the stack and that the central portion of the stack corresponding to the cooling zone of FIG. 4B experienced a slight increase in temperature. The maximum temperature in the stack, however, stayed at approximately 663-665° C.

FIG. 5D shows the temperature distribution at the end-of-life of the stack after about 35,000 hours of operation. As can be seen, the high temperature zone at the end-of-life of the stack shifted further toward the fuel inlet side of the stack, with the highest temperatures reaching 675° C. This temperature distribution is attributed to the depletion of the direct reforming catalyst in the anode chambers near the fuel inlet.

As can be seen from the temperature distributions in FIGS. 5B-5D, compared with the temperature distribution in FIG. 5A, the present design leaves room for direct reforming catalyst aging near the fuel inlet without a significant maximum temperature increase during the life of the stack. Moreover, low temperature gradients are maintained in the stack throughout its life.

Figure 6:
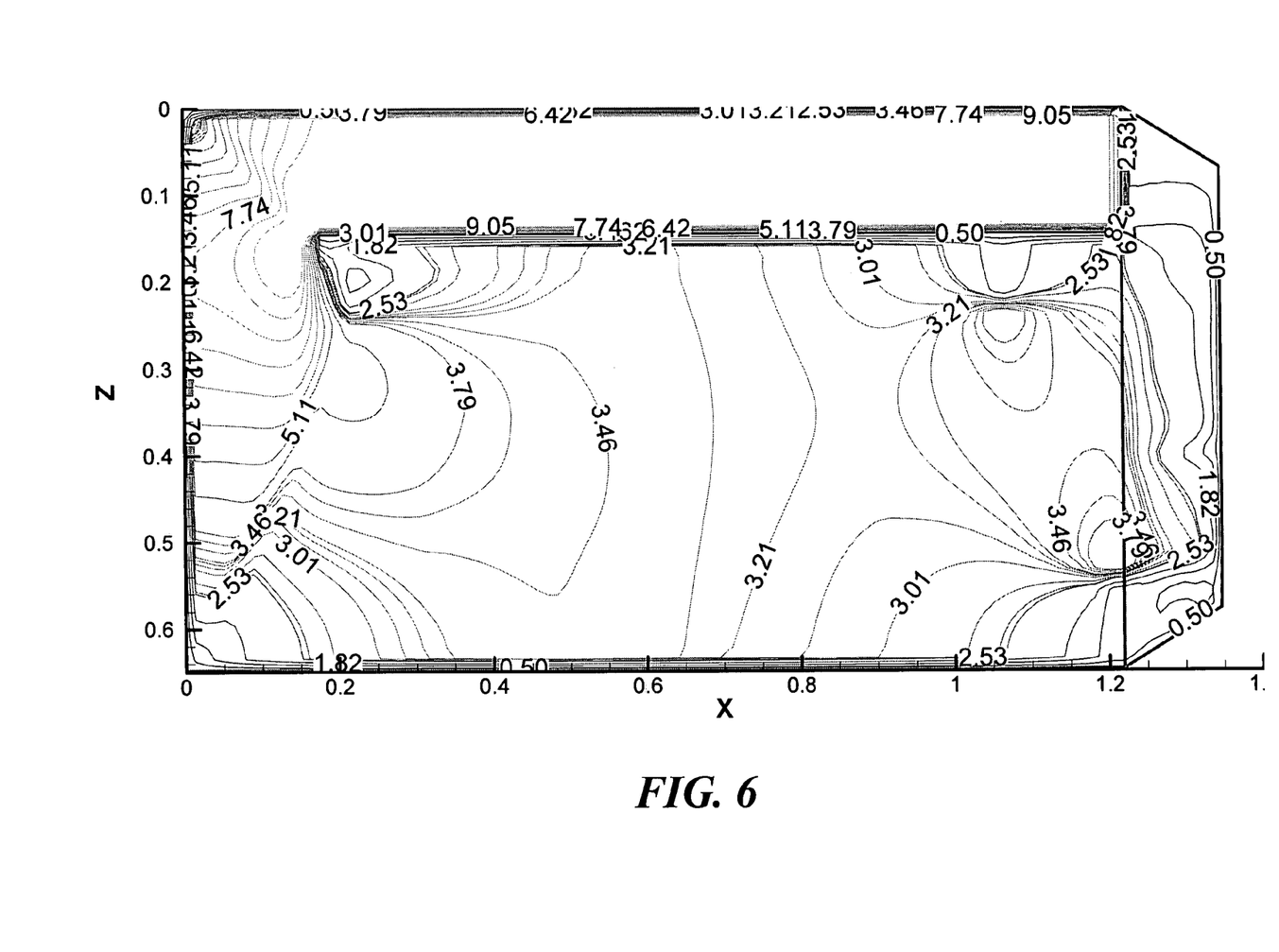
FIG. 6 shows a line contour diagram of the fuel gas flow field within the reformer of FIG. 1.

FIG. 6 is a line contour diagram of the fuel gas flow field within the reformer 100 of FIG. 1. As shown, the X-axis in FIG. 6 represents the length of the reformer 100, while the Z-axis represents the width of the reformer 100. FIG. 6 demonstrates an increased fuel flow in the center region of the return section 104. It can be seen that the baffle 6 directs more fuel to the center of the return section rather than into corner C of the reformer 100. It can also be seen that the fuel gas flow is directed around the baffles 7 and 8 and also pushed toward the center of the return path in the return section 104.

As also discussed above, use of the baffles, and particularly of the exit baffles 7 and 8, increases the mixing of the fuel gas in the reformer, thereby providing a more uniform concentration of the fuel gas leaving the reformer 100 and entering the fuel turn manifold 203. As a result, there is a greater uniformity in the concentration of unreformed fuel, namely unreformed methane, in the fuel gas entering the fuel turn manifold 203. Increased uniformity in turn reduces the temperature gradient in the fuel cell anodes of the stack 200.

Figure 7A:
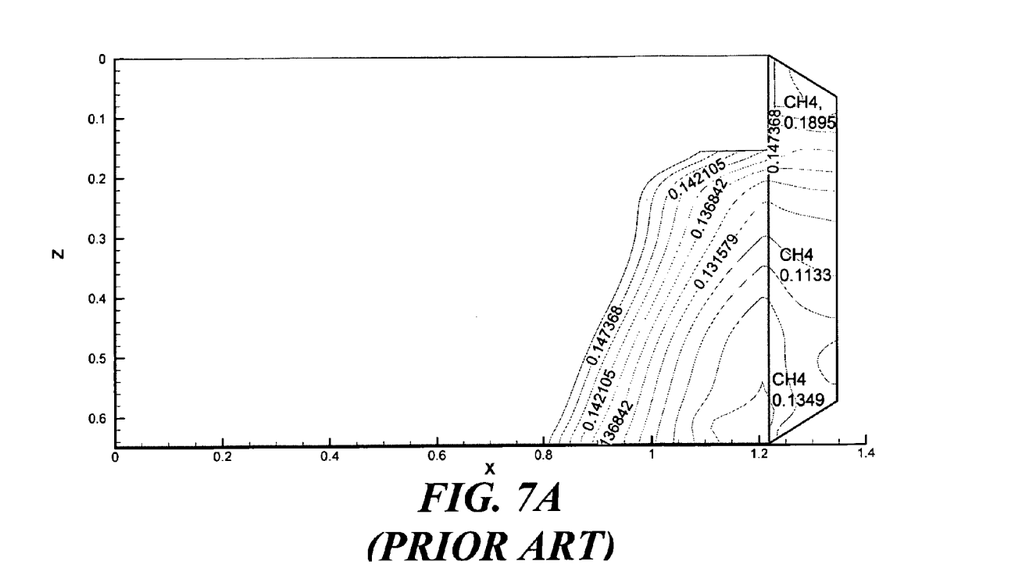
FIG. 7A shows a line contour diagram of methane concentration distribution in a reformer without baffles.
Figure 7B:
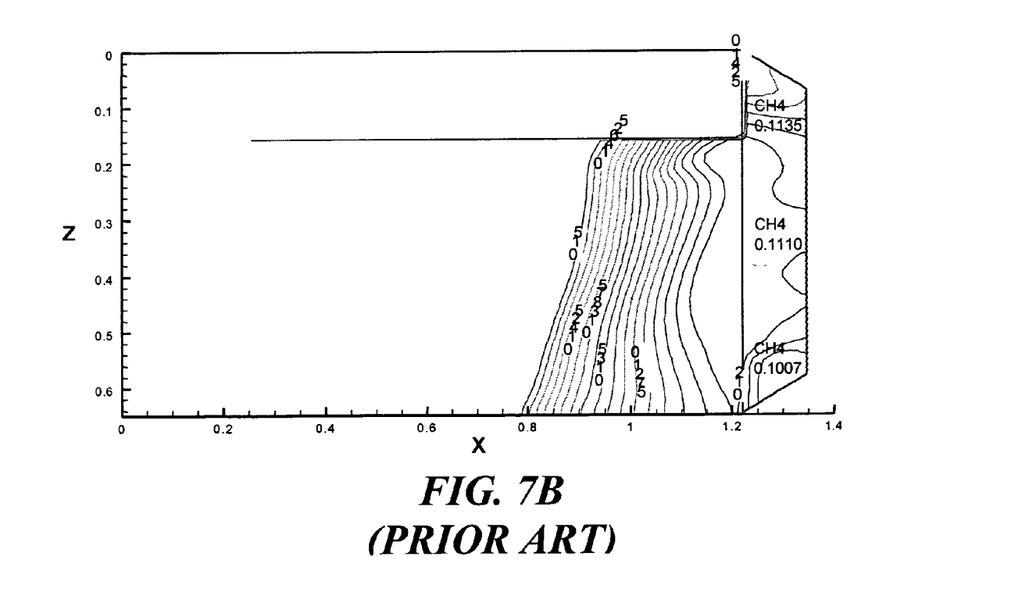
FIG. 7B shows a line contour diagram of methane concentration distribution in a reformer with one main baffle.

FIGS. 7A and 7B show line contour diagrams of methane distribution at the exit portion of the reformer and in the fuel turn manifold. Particularly, FIGS. 7A and 7B demonstrate the increase in the uniformity of methane concentration through use of baffles. FIG. 7A illustrates methane distribution in a reformer which does not employ any baffles to direct the fuel gas through the reformer. FIG. 7B shows methane distribution in the reformer which includes a baffle extending along substantially the entire interface of the plates 2A and 2C.

As shown in FIG. 7A, there is a deviation of approximately 7% in the concentration of methane within the fuel turn manifold, with methane concentration being significantly greater (18.95%) near corner A of the reformer than in the central portion of the fuel turn manifold (11.33%). This non-uniformity of methane distribution in the fuel turn manifold results in a similar non-uniformity of methane concentrations in the fuel gas entering the anode chambers of the fuel cells. Namely, the fuel gas entering the anode chambers near the oxidant inlet face 208 of the stack will have greater methane concentrations than the anode chambers located in the center of the fuel cell or the anode chambers near the oxidant outlet face of the stack. As can be appreciated, this unreformed methane undergoes an endothermic reforming reaction in the presence of the direct reforming catalyst in the anode chambers of the stack. Therefore, greater methane concentrations in the fuel flowing through the anode along the face 204 of the stack produce greater cooling in that region of the stack and undesirable temperature gradients within the stack. More particularly, overcooling of the oxidant inlet region of the stack prevents the oxidant gas entering the cathodes from being heated quickly in order to reduce the temperature gradient within the stack. Moreover, overcooling of this region in the anode prevents methane rich gas from being fully reformed.

As can be seen in FIG. 7B, the uniformity of methane concentration is improved when a baffle is provided along the interface of the plates 2A and 2C in order to direct the fuel in the reformer. As shown in FIG. 7B, the deviation between the lowest and the highest methane concentrations within the fuel turn manifold is reduced from 7% to approximately 1 to 2%. Such improved uniformity in methane concentration avoids wasting of the reforming cooling effect at the oxidant inlet region of the stack and lowers the temperature gradient within the stack. The improvement shown in FIG. 7B in the uniformity of methane distribution in the reformer arrangement of FIG. 1 is attributed to the greater mixing of the fuel within the reformer created by baffles 7 and 8 and to the sealing provided by the baffle 6 between the inlet and the return sections of the reformer.

The extension of the baffle 6 into the turn section of the reformer and the exit baffles 7 and 8 shown in FIG. 1 provide further mixing of the fuel gas as well as greater sealing between the inlet and return sections of the reformer near the outlet of the reformer. The reformer 100 shown in FIGS. 1 and 3 therefore significantly reduces deviations in methane concentrations in the fuel turn manifold and improves the temperature gradient in the fuel cell stack.

The arrangement of the baffles in the reformers 100 and the catalyst distribution have been discussed in terms of realizing an improvement in the temperature distribution in the fuel cell stack 200. It is also within the contemplation of the invention to provide additional exit baffles and/or modify the catalyst distribution to achieve a desired fuel gas flow and fuel gas composition leaving the reformers 100 for entry into the anode chambers of the fuel cells 202 of the stack 200.

In all cases it is understood that the above-described arrangements are merely illustrative of the many possible specific embodiments which represent applications of the present invention. Numerous and varied other arrangements can be readily devised in accordance with the principles of the present invention without departing from the spirit and the scope of the invention. For example, the baffle arrangement of FIG. 1 may be used with conventional catalyst distributions. Additionally, the location of the exit baffles 7 and 8 may be varied within the return section of the reformer. Also, one exit baffle instead of two, or additional exit baffles, may be used to direct the flow of the fuel to the central portion of the return section of the reformer.

What is claimed is:

1. A fuel reformer comprising:
an enclosure having: first and second opposing surfaces; a sidewall connecting said first and second opposing surfaces; and an inlet port and an outlet port in said sidewall;
a plate assembly for supporting catalyst disposed within said enclosure; and
a plurality of baffles in said enclosure each extending between the first and second opposing surfaces of the enclosure, the plurality of baffles comprising: a main baffle extending into said enclosure from a point of said sidewall between said inlet and outlet ports, said main baffle cooperating with said enclosure and said plate assembly to establish a flow path for the flow of fuel gas through said reformer from said inlet port to said outlet port; and at least a first directing baffle extending in said enclosure and cooperating with said enclosure and said plate assembly to alter said flow path, and wherein
said first directing baffle extends from said sidewall; and said plurality of baffles include a second directing baffle extending in said enclosure from said main baffle and cooperating with said enclosure and plate assembly to alter said flow path;
said first directing baffle extends from said sidewall at a point adjacent said outlet port; and said second directing baffle extends from said main baffle at a point spaced from said outlet port; and
said sidewall comprises: first and second opposing sidewall sections and third and fourth opposing sidewall sections, said first sidewall section being connected between a first set of opposing ends of said third and fourth sidewall sections and said second sidewall section being connected between a second set of opposing ends of said third and fourth sidewall sections; said inlet port and said outlet port are in said first sidewall section such that said outlet port is closer to said fourth sidewall section than said inlet port; said main baffle extends from a point in said first sidewall section between said inlet and outlet ports and in spaced relationship to said third and fourth sidewall sections to a point in said enclosure spaced from said second sidewall section; said first directing baffle extends from said fourth sidewall section in the direction of said main baffle to a point spaced from said main baffle; and said second directing baffle extends from said main baffle in the direction of said fourth sidewall section to a point spaced from said fourth sidewall; and
wherein the end of said main baffle in said enclosure comprises: a first segment angled toward said fourth sidewall section and away from a corner at which the fourth sidewall section connects to the second sidewall section; and a second segment proceeding from said first segment and angled toward said fourth sidewall section and said corner.

2. A fuel reformer in accordance with claim 1, wherein: said plate assembly includes first, second and third plates, said first plate being situated between said main baffle and said third sidewall section, said second plate being situated between the end of said main baffle in said enclosure and said second sidewall section, and said third plate being situated between said main baffle and said fourth sidewall section; said first, second and third plates, said main baffle and said enclosure define an inlet section communicating with said inlet port, a return section communicating with said outlet port and a turn section connecting said inlet section to said outlet section; and said end of said main baffle and said first and second directing baffles promote movement of said flow path toward the central region of said return section between said fourth sidewall section and said main baffle.

3. A reformer in accordance with claim 2, wherein said return section is of greater width than said inlet section.

4. A fuel reformer in accordance with claim 2, wherein said first segment and said second segment of said end of said main baffle have lengths so as to promote movement of said flow path to the central region of said return section between said fourth sidewall section and said main baffle.

5. A fuel reformer in accordance with claim 4, wherein said first segment and said second segment have equal lengths.

6. A fuel reformer in accordance with claim 2, wherein: said second plate is triangular and has a base adjacent said second sidewall and first and second sides extending from opposite ends of said base into said enclosure and connecting at a peak; said first plate is substantially rectangular with a side angled to abut and follow a first segment of said first angled side of said second plate; said third plate is substantially rectangular with a side angled to abut and follow the remaining segment of the first angled side of said second plate and the second angled side of said second plate; said first segment of said end of said main baffle is situated between the part of the side of said first plate abutting said remaining segment of said first angled side of said second plate and said remaining segment of said first angled side of said second plate; and the second segment of said end of said main baffle is situated between a portion of said second angled side of said second plate and the part of said angled side of said third plate abutting said portion of said second angled side of said second plate.

7. A fuel reformer in accordance with claim 1, wherein:
said main baffle and said enclosure define an inlet section communicating with said inlet port, a return section communicating with said outlet port and a turn section connecting said inlet section to said outlet section; and said end of said main baffle and said first and second directing baffles promote movement of said flow path toward the central region of said return section between said fourth sidewall section and said main baffle; and
said plate assembly supports catalyst such that said inlet section and an entry of said turn section are devoid of catalyst, and a remaining portion of said turn section and said return section contain catalyst varying in a predetermined manner along said flow path.

8. A fuel reformer in accordance with claim 7, wherein said return section comprises a plurality of subsections situated along said flow path and each of said subsections contains a predetermined catalyst density.

9. A fuel reformer in accordance with claim 8, wherein said plurality of subsections comprises:

a first subsection abutting said turn section,
a second subsection disposed adjacent said first subsection along said flow path of the fuel,
a third subsection disposed adjacent said second subsection along said flow path, and
a fourth subsection adjacent said third subsection and said outlet port.

10. A fuel reformer in accordance with claim 9, wherein said remaining portion of the turn section and the return section contain catalyst such that the rate of cooling is higher in the second and third subsections than in said remaining portion of the turn section and the first subsection.

11. A fuel reformer in accordance with claim 10, wherein said remaining portion of said turn section contains catalyst of a first density, said first subsection of said return section contains catalyst of a second density higher than said first density, said second subsection of said return section contains catalyst of a third density higher than said second density and said third and fourth subsections contain catalyst of a fourth density higher than said third density.

12. A fuel reformer in accordance with claim 11, wherein said third density has a variable density such that said density increases along said flow path.

13. A fuel reformer in accordance with claim 2, wherein each of said first, second and third plates is corrugated.

14. A fuel reformer in accordance with claim 2, wherein said plate assembly supports catalyst such that said inlet section and an entry of said turn section are devoid of catalyst, and a remaining portion of said turn section and said return section contain catalyst varying in a predetermined manner along said flow path.

15. A fuel cell assembly having a fuel reformer in accordance with claim 1, further comprising a fuel cell stack assembly having a plurality of fuel cells, each of said fuel cells including an anode and a cathode; and wherein said reformer is incorporated in said fuel cell stack assembly such that the outlet port of said reformer communicates with the anodes of said fuel cell stack assembly.

* * * * *